United States Patent
Han et al.

(10) Patent No.: US 11,289,695 B2
(45) Date of Patent: Mar. 29, 2022

(54) POSITIVE ELECTRODE ACTIVE MATERIAL COMPRISING LITHIUM-RICH LITHIUM MANGANESE-BASED OXIDE AND FURTHER COMPRISING LITHIUM TUNGSTEN COMPOUND, OR ADDITIONALLY TUNGSTEN COMPOUND ON THE LITHIUM-RICH LITHIUM MANGANESE-BASED OXIDE, AND POSITIVE ELECTRODE FOR LITHIUM SECONDARY BATTERY COMPRISING THE SAME

(71) Applicant: LG Chem, Ltd., Seoul (KR)

(72) Inventors: Gi Beom Han, Daejeon (KR); Jintae Hwang, Daejeon (KR); Sungbin Park, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 179 days.

(21) Appl. No.: 16/489,562

(22) PCT Filed: Sep. 7, 2018

(86) PCT No.: PCT/KR2018/010472
§ 371 (c)(1),
(2) Date: Aug. 28, 2019

(87) PCT Pub. No.: WO2019/066297
PCT Pub. Date: Apr. 4, 2019

(65) Prior Publication Data
US 2019/0386294 A1     Dec. 19, 2019

(30) Foreign Application Priority Data

Sep. 29, 2017    (KR) ........................ 10-2017-0128179
Aug. 31, 2018    (KR) ........................ 10-2018-0103798

(51) Int. Cl.
*H01B 1/08*     (2006.01)
*H01M 4/36*     (2006.01)
(Continued)

(52) U.S. Cl.
CPC .......... *H01M 4/364* (2013.01); *C01G 41/006* (2013.01); *C01G 53/50* (2013.01); *H01B 1/08* (2013.01);
(Continued)

(58) Field of Classification Search
CPC .. H01B 1/06; H01B 1/08; H01B 1/10; H01M 4/0471; H01M 4/131; H01M 4/1391; H01M 4/364; H01M 4/525
See application file for complete search history.

(56) References Cited

U.S. PATENT DOCUMENTS 9,293,761 B2    3/2016   Cho et al.
10,217,997 B2   2/2019   Hah et al.
(Continued)

FOREIGN PATENT DOCUMENTS

CN    103155240 A    6/2013
CN    103633329 A    3/2014
(Continued)

OTHER PUBLICATIONS

Extended European Search Report including Written Opinion for Application No. EP18860518.2 dated May 8, 2020, 9 pages.
(Continued)

*Primary Examiner* — Mark Kopec
(74) *Attorney, Agent, or Firm* — Lerner, David, Littenberg, Krumholz & Mentlik, LLP

(57) ABSTRACT

A positive electrode active material includes a lithium-rich lithium manganese-based oxide,
wherein the lithium-rich lithium manganese-based oxide is represented by the following chemical formula (1), $$Li_{1+a}Ni_xCo_yMn_zM_vO_{2-b}A_b \quad (1)$$

wherein, $0<a\leq0.2$, $0<x\leq0.4$, $0<y\leq0.4$, $0.5\leq z\leq0.9$, $0\leq v\leq0.2$, $a+x+y+z+v=1$, and $0\leq b\leq0.5$;
M is one or more elements selected from the group consisting of Al, Zr, Zn, Ti, Mg, Ga, In, Ru, Nb, and Sn; and
A is one or more elements selected from the group consisting of P, N, F, S and Cl;
wherein
(i) lithium tungsten (W) compound, or
(Continued)

the (i) lithium tungsten (W) compound and
(ii) tungsten (W) compound are contained on the lithium-rich lithium manganese-based oxide; in an amount of 0.1% to 7% by weight based on the total weight of the positive electrode active material, wherein the (i) lithium tungsten (W) compound includes a composite of the (ii) tungsten (W) compound and a lithium.

11 Claims, 4 Drawing Sheets

(51) Int. Cl.
*C01G 41/00* (2006.01)
*C01G 53/00* (2006.01)
*H01M 4/485* (2010.01)
*H01M 4/505* (2010.01)
*H01M 4/525* (2010.01)
*H01M 10/0525* (2010.01)
*H01M 4/02* (2006.01)

(52) U.S. Cl.
CPC .......... *H01M 4/485* (2013.01); *H01M 4/505* (2013.01); *H01M 4/525* (2013.01); *H01M 10/0525* (2013.01); *C01P 2002/50* (2013.01); *C01P 2004/03* (2013.01); *C01P 2004/61* (2013.01); *C01P 2004/62* (2013.01); *C01P 2004/64* (2013.01); *C01P 2004/84* (2013.01); *C01P 2006/40* (2013.01); *H01M 2004/028* (2013.01)

(56) References Cited

U.S. PATENT DOCUMENTS

| | | | | |
|---|---|---|---|---|
| 10,497,936 B2 * | 12/2019 | Kondo | .................. | H01M 4/366 |
| 10,797,302 B2 * | 10/2020 | Furuichi | .................. | H01B 1/08 |
| 10,818,916 B2 * | 10/2020 | Shin | .................. | H01M 50/20 |
| 10,874,500 B2 * | 12/2020 | Behan | .................. | A61M 39/24 |

| | | | | |
|---|---|---|---|---|
| 2014/0087263 A1 * | 3/2014 | Matsumoto | ............ | C01G 53/50 429/223 |
| 2014/0329146 A1 | 11/2014 | Niina et al. | | |
| 2015/0228974 A1 | 8/2015 | Kokado et al. | | |
| 2017/0256801 A1 | 9/2017 | Sugimori et al. | | |
| 2017/0352885 A1 | 12/2017 | Kondo et al. | | |
| 2018/0261873 A1 | 9/2018 | Yamaji et al. | | |
| 2018/0287135 A1 | 10/2018 | Shin et al. | | |
| 2018/0309116 A1 | 10/2018 | Goto et al. | | |

FOREIGN PATENT DOCUMENTS

| | | | |
|---|---|---|---|
| CN | 103688396 | A | 3/2014 |
| EP | 2624342 | A1 | 8/2013 |
| JP | S62139260 | A | 6/1987 |
| JP | 2012129166 | A | 7/2012 |
| JP | 2013125732 | A | 6/2013 |
| JP | 2016127004 | A | 7/2016 |
| JP | 2016225275 | A | 12/2016 |
| JP | 2017010841 | * | 1/2017 |
| JP | 2017010841 | A | 1/2017 |
| JP | 2017134996 | A | 8/2017 |
| KR | 20140044594 | A | 4/2014 |
| KR | 20150080219 | A | 7/2015 |
| KR | 20150108761 | A | 9/2015 |
| KR | 20160026402 | A | 3/2016 |
| KR | 20160050835 | A | 5/2016 |
| KR | 20170063395 | A | 6/2017 |
| WO | 2012165654 | A1 | 12/2012 |
| WO | 2016047031 | A1 | 3/2016 |
| WO | 2017090378 | A1 | 6/2017 |
| WO | 2017094238 | A1 | 6/2017 |
| WO | WO 2017095134 | A1 * | 6/2017 |

OTHER PUBLICATIONS

International Search Report from Application No. PCT/KR2018/010472 dated Mar. 13, 2019, pp. 1-2.
Chinese Search Report for Application No. 201880016005.X dated Dec. 2, 2021, 3 pages.

* cited by examiner

[FIG. 1]
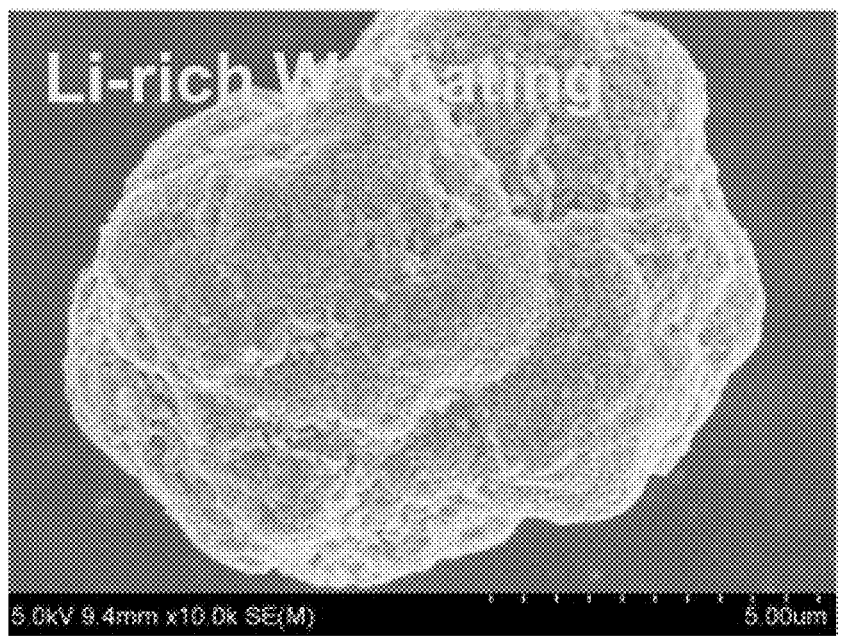
[FIG. 2]
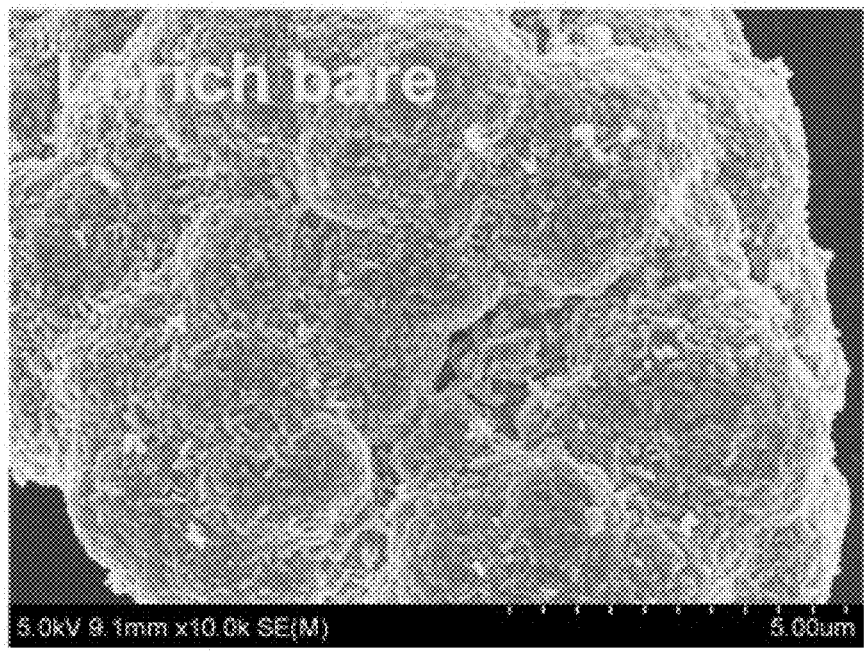

【FIG. 3】
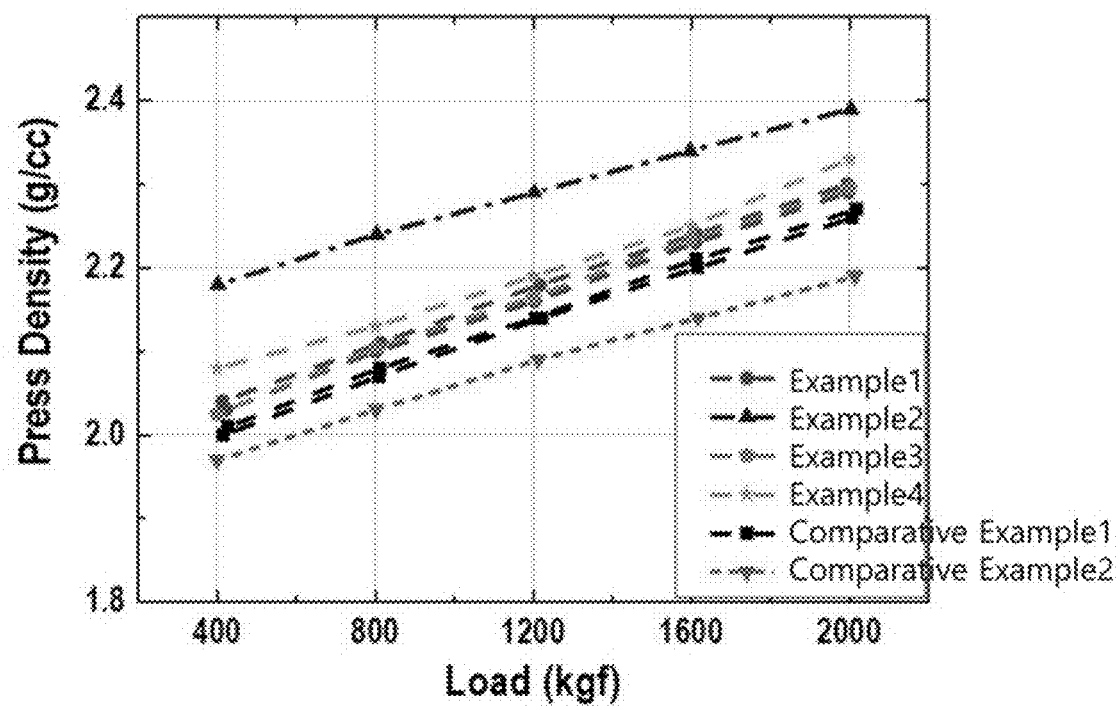

[FIG. 4]
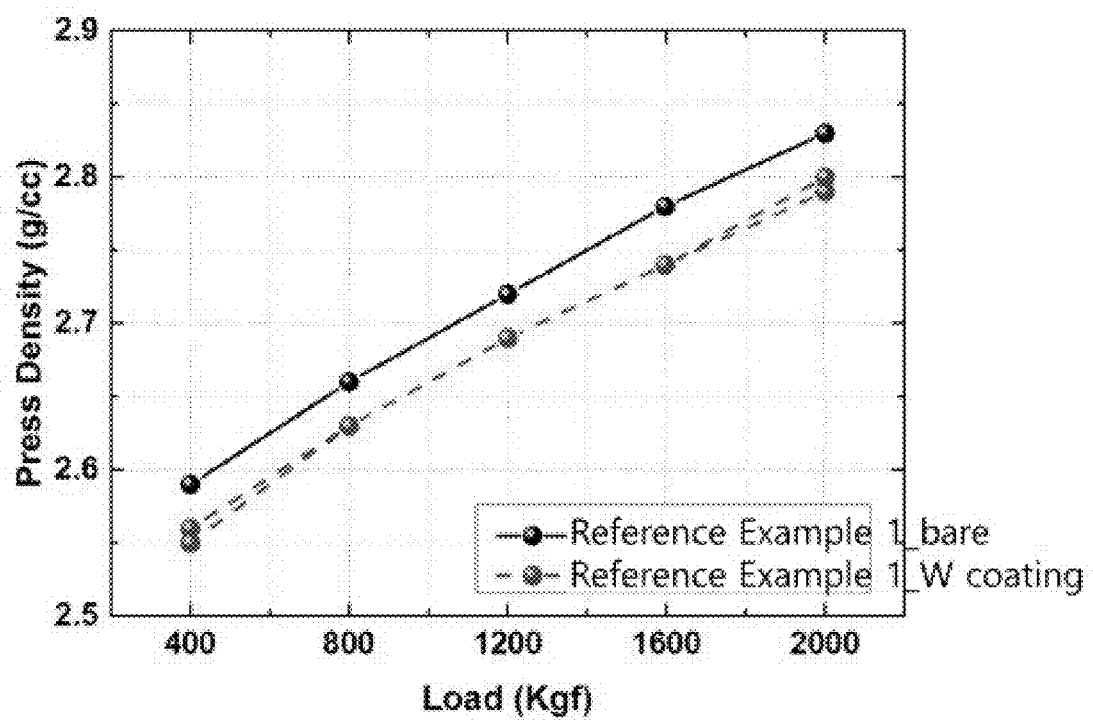

[FIG. 5]
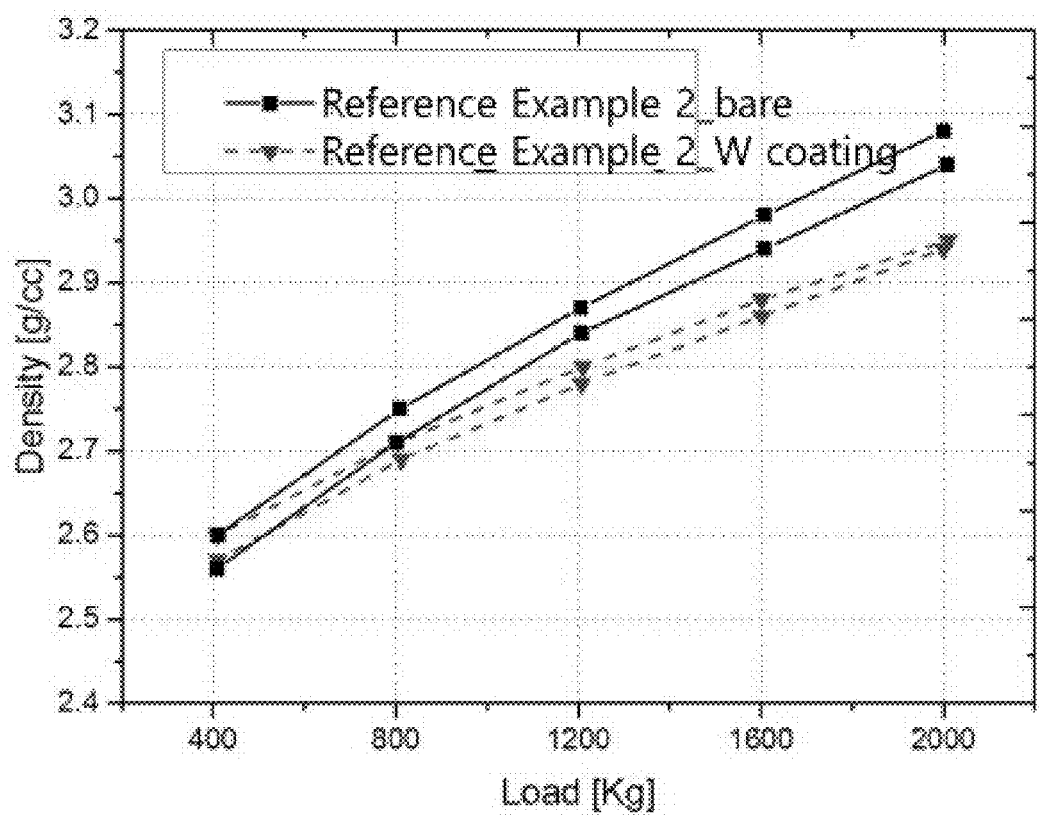

POSITIVE ELECTRODE ACTIVE MATERIAL COMPRISING LITHIUM-RICH LITHIUM MANGANESE-BASED OXIDE AND FURTHER COMPRISING LITHIUM TUNGSTEN COMPOUND, OR ADDITIONALLY TUNGSTEN COMPOUND ON THE LITHIUM-RICH LITHIUM MANGANESE-BASED OXIDE, AND POSITIVE ELECTRODE FOR LITHIUM SECONDARY BATTERY COMPRISING THE SAME

CROSS-REFERENCE TO RELATED APPLICATION(S)

This application is a national phase entry under 35 U.S.C. § 371 of International Application No. PCT/KR2018/010472, filed Sep. 7, 2018, which claims priority to Korean Patent Application No. 10-2017-0128179, filed Sep. 29, 2017, and Korean Patent Application No. 10-2018-0103798, filed Aug. 31, 2018, the entire contents of which are incorporated herein by reference.

TECHNICAL FIELD

The present invention relates to a positive electrode active material comprising a lithium-rich lithium manganese-based oxide and further comprising a lithium tungsten compound, or additionally a tungsten compound on the lithium-rich lithium manganese-based oxide, and a positive electrode for a lithium secondary battery comprising the same.

BACKGROUND ART

In accordance with technological development and increased demand for mobile devices, demand for using secondary batteries as energy sources has rapidly increased. Among these secondary batteries, lithium secondary batteries having high energy density and operating potential, long cycle life, and low self-discharge ratio are commercially available and widely used.

Also, in line with growing concerns about environmental issues, a great deal of research associated with electric vehicles and hybrid electric vehicles which are capable of substituting for vehicles using fossil fuels such as gasoline vehicles and diesel vehicles, which are one of major causes of air pollution, have been conducted. Although nickel-metal hydride secondary batteries have mainly been used as power sources for such electric vehicles and hybrid electric vehicles, a great deal of research has also been carried out into lithium secondary batteries having high energy density, high discharge voltage, long cycle life, and low self-discharge rate, and some of the lithium secondary batteries are commercially available.

Carbon materials are mainly used for a negative electrode active material of these lithium secondary batteries, and the use of lithium metal, sulfur compounds and the like are also under consideration. Moreover, lithium-containing cobalt oxide ($LiCoO_2$) is mainly used for a positive electrode active material and, in addition, the uses of lithium-containing manganese oxides, such as $LiMnO_2$ having a layered crystal structure and $LiMn_2O_4$ having a spinel crystal structure, and lithium-containing nickel oxides ($LiNiO_2$) are also under consideration.

Among the above-mentioned positive electrode active materials, $LiCoO_2$ is most commonly used due to its excellent lifetime characteristics and high charge-discharge efficiency, but has low structural stability. In addition, due to the resource limitations of cobalt, which is a raw material, $LiCoO_2$ is expensive, and therefore price competitiveness is low, whereby the massive use thereof as power sources in fields such as electric vehicles is limited.

$LiNiO_2$ based positive electrode active materials are relatively inexpensive, and makes it possible for a battery to have high discharge capacity. However, phase transition abruptly occurs in the crystal structure depending on the change in volume of the battery caused by charge-discharge cycle. In addition, when $LiNiO_2$ is exposed to air and moisture, the safety of $LiNiO_2$ is abruptly lowered.

In addition, lithium manganese oxides such as $LiMnO_2$, $LiMn_2O_4$, etc. have merits of excellent thermal safety and low price but entail disadvantages such as low capacity, poor cycle life characteristics, poor high-temperature characteristics, etc.

In this regard, for a lithium transition metal oxide containing a high content of Mn, an attempt has been made to use an oxide containing excessive lithium wherein the content of lithium is higher than the content of the transition metal such that a high capacity of 270 or more mAh/g is exhibited at a high voltage of 4.5 V or higher.

The oxide containing excessive lithium has a composition limit that rate characteristics are low, and thus controls the structure in such a direction as to improve the rate characteristics by making the primary particles smaller and making the BET of the secondary particles larger. However, control of such a structure causes a problem that the surface is rough and the press density is lowered.

Moreover, in the oxide containing excessive lithium, in addition to lithium, oxygen escapes from the active material structure at the time of high-voltage activation to utilize excessive lithium. As a result, it has been found that the active material structure may collapse, a voltage sagging phenomenon resulting therefrom may occur, the deterioration of the battery cell may be accelerated, an increase of the resistance and generation of gas and the like may be caused due to decomposition of the electrolyte according to high-voltage driving, thereby further accelerating deterioration of the battery cell.

In order to solve these problems, conventionally, attempts have been made to coat a metal oxide onto the surface of these positive electrode active materials to thereby enhance the surface stability. However, in this case, not only the electrical conductivity and the ionic conductivity are lowered by the coated metal oxide to deteriorate the battery performance, but also with the decrease of the mass of the active material due to the increase of the mass of the coating layer, there was no choice but to accept the damage of the volume side Therefore, positive electrode active material technologies having excellent battery cell performance while solving the problems of the oxide containing excessive lithium are highly required.

DETAILED DESCRIPTION OF THE INVENTION

Technical Problem

The present invention has been made to solve the problems of conventional techniques and other technical problems that have yet to be resolved.

As a result of a variety of extensive and intensive studies and experiments to solve the problems described above, the present inventors have found that as will be described later, when using a positive electrode active material in which a lithium tungsten compound, or both the lithium tungsten compound and a tungsten (W) compound is contained on a lithium-rich lithium manganese-based oxide (having a composition of Mn of 0.5 or more), desired effects can be exhibited, thereby completing the present invention.

Technical Solution

Therefore, the positive electrode active material according to the present invention is a positive electrode active material including a lithium-rich lithium manganese-based oxide, wherein the lithium-rich lithium manganese-based oxide is represented by the following chemical formula (1),

$$Li_{1+a}Ni_xCo_yMn_zM_vO_{2-b}A_b \tag{1}$$

wherein, $0<a\leq0.2$, $0<x\leq0.4$, $0<y\leq0.4$, $0.5\leq z\leq0.9$, $0\leq v\leq0.2$, $a+x+y+z+v=1$, and $0\leq b\leq0.5$;

M is one or more elements selected from the group consisting of Al, Zr, Zn, Ti, Mg, Ga, In, Ru, Nb, and Sn; and A is one or more elements selected from the group consisting of P, N, F, S and Cl;

wherein (i) lithium tungsten (W) compound, or the (i) lithium tungsten (W) compound and (ii) tungsten (W) compound are contained on a lithium-rich lithium manganese-based oxide, wherein the (i) lithium tungsten (W) compound including a composite of the (ii) tungsten (W) compound and a lithium, and wherein the (i) lithium tungsten (W) compound, or the (i) lithium tungsten (W) compound and the (ii) tungsten (W) compound are contained in an amount of 0.1% to 7% by weight based on the total weight of the positive electrode active material.

Specifically, in order to exhibit a higher capacity under a high voltage, $0<x\leq0.2$, $0<y\leq0.2$, $0.6\leq z\leq0.9$, and $0\leq v\leq0.1$.

Generally, as the lithium-rich lithium manganese-based oxide, an active material having 50 mol % or more of Mn has been actively developed as high-voltage and high-capacity materials for realizing a high energy density, as described above. However, the active material causes a side reaction due to high-voltage driving, which leads to an increase in resistance of the positive electrode active material, an increase in resistance due to the decomposition of the electrolyte, a generation of gas, and the like, thereby further promoting deterioration of the battery cell. Thus, the surface treatment of the positive electrode active material is necessary.

In this connection, active materials other than the above-mentioned composition also have the above-mentioned problems during high voltage driving, and thus attempts have been made to introduce a coating layer of a metal oxide such as $Al_2O_3$ or $WO_3$. However, the positive electrode active material according to the present invention is a lithium manganese-based oxide having Mn of 50 mol % or more, and there is an additional problem that low press density and rate characteristics are limited in the realization of energy density. The rate characteristics are rather further reduced by the surface treatment of the metal oxide as described above, and there has still been a problem that the cell performance other than surface protection is poor.

In addition, in the active material according to the present invention, solving the problem of low press density is essential for realizing high energy density. However, in general, when the positive electrode active material is surface-treated with a lithium metal oxide, the press density is lowered even though the effect of improving the performance of other battery cells can be achieved. It has been only applied to a limited active material, which has excellent press density as such. Such attempts have been difficult in lithium-rich lithium manganese-based oxides where it is difficult to obtain the desired degree of press density as described above.

In this regard, the present inventors have conducted extensive and intensive researches, and have found that in the lithium-rich lithium manganese-based oxide according to the present invention, when a tungsten compound is used to form a lithium tungsten compound on the lithium-rich lithium manganese-based oxide, unlike the lithium transition metal oxides having other compositions, not only the surface protection property is improved, but also the problem of the reduction of the press density and rate characteristics as characteristic defects appearing in the lithium-rich lithium manganese-based oxide is solved, making it possible to realize a high energy density, thereby completing the present invention.

That is, unlike other active materials where the press density is rather reduced by the surface treatment of the lithium metal oxide, it was found that the lithium-rich lithium manganese-based oxide according to the present invention exhibits further improved effects.

Therefore, a lithium tungsten compound may be contained on the lithium-rich lithium manganese-based oxide according to the present invention, and in addition, a tungsten compound that has not reacted with lithium may be contained together.

As used herein, (i) lithium tungsten (W) compound, or the (i) lithium tungsten (W) compound and (ii) tungsten (W) compound being contained "on" the lithium-rich lithium manganese-based oxide may mean that the (i) lithium tungsten (W) compound, or the (i) lithium tungsten (W) compound and (ii) tungsten (W) compound are formed in the vicinity of the surface of the lithium-rich manganese-based oxide, for example, at a distance of within 20% or 10% of the radius from the surface of the lithium-rich lithium manganese-based oxide. Thus, the presence of the tungsten-containing component formed in the vicinity of the surface of the lithium-excess lithium manganese-based oxide can be confirmed by elemental analysis of the surface of the lithium manganese-based oxide with ICP or the like.

Here, the lithium tungsten compound is formed by mixing a lithium-rich lithium manganese-based oxide and a tungsten compound and subjecting the mixture to a heat treatment reaction. Specifically, the tungsten compound reacts with lithium existing in the lithium manganese-based oxide to form a lithium tungsten compound.

Therefore, when the tungsten compound completely reacts with lithium in the lithium-rich lithium manganese-based oxide, a lithium tungsten compound alone can be contained on the lithium-rich lithium manganese-based oxide. Otherwise, a tungsten compound and a lithium tungsten compound may also be present together.

Here, reacting with lithium in the lithium-rich lithium manganese-based oxide mainly means reacting with lithium existing as excess on the surface of the above-mentioned oxide, but being formed by reaction with excess lithium in the lattice that constitutes the lithium manganese-based oxide by heat treatment. Therefore, due to these reactions, the lithium-rich lithium manganese-based oxide is partially modified into a lithium-quantitative lithium manganese-based oxide or a lithium-deficient lithium manganese-based oxide. Thereby, the positive electrode active material according to the present invention may also include an oxide having the above composition, and thus, these additional forms are, of course, included in the scope of the present invention.

At this time, the (i) tungsten (W) compound, or the (i) tungsten (W) compound and (ii) lithium tungsten compound may be contained in an amount of 0.1% to 7% by weight, in particular 2% to 7% by weight, based on the total weight of the positive electrode active material.

If the content is too large beyond the above range, the content of the tungsten compound remaining left unreacted is large and thus an increase in resistance may occur, which is not preferable.

Here, the total amount of the (i) tungsten (W) compound, or the (i) tungsten (W) compound and (ii) lithium tungsten compound contained in the lithium-rich lithium manganese-based oxide may be determined by analyzing the surface of the lithium-rich manganese-based oxide with ICP, quantitatively analyzing the tungsten element and then calculating therefrom, but it may be calculated from the amount of the raw material containing tungsten (W) added in the preparation process of the positive electrode active material described later. This is because the raw material containing tungsten (W) appears to be capable of reacting equivalently on the lithium manganese-based oxide to form the lithium tungsten (W) compound or the (i) lithium tungsten (W) compound and (ii) tungsten (W) compound.

The tungsten (W) compound is not limited as long as it contains tungsten, and may be, for example, at least one selected from the group consisting of tungsten oxide, tungsten carbide, and tungsten nitride. Specifically, it can be tungsten oxide, particularly, in order to prevent the formation of additional compounds by heat treatment.

In addition, the lithium tungsten compound produced by the reaction of the tungsten compound and lithium may be, for example, a material such as $Li_2WO_4$, $Li_4WO_5$ or $Li_6W_2O_9$.

On the other hand, the lithium-rich lithium manganese-based oxide generally has an average particle diameter (D50) of 1 μm to 50 μm. Thus, based on this, the range in which the (i) lithium tungsten (W) compound or the (i) lithium tungsten (W) compound and (ii) tungsten (W) compound are contained can be set.

The average particle diameter ($D_{50}$) is defined as a particle diameter based on 50% of the particle diameter distribution, and for example, it can be measured using a laser diffraction method.

Further, another embodiment of the present invention provides a method for producing the above-mentioned positive electrode active material, the method comprising the steps of:
(i) mixing a lithium-rich manganese-based oxide and a tungsten (W)-containing raw material;
(ii) heat treating the mixture of step (i);
wherein the tungsten (W)-containing raw material may be mixed so as to contained in an amount of 0.1% to 5% by weight based on the total weight of the lithium-rich lithium manganese-based oxide and the tungsten-containing raw material.

As described above, the positive electrode active material according to the present invention can be formed by mixing a lithium-rich manganese-based oxide and a tungsten (W)-containing raw material.

At this time, the tungsten (W)-containing raw material may be at least one selected from the group consisting of tungsten oxide, tungsten carbide, and tungsten nitride, which may exist as a consequence, and the above materials may react with lithium (Li) of a lithium-rich manganese-based oxide by heat treatment to form a lithium tungsten compound.

At this time, the tungsten (W)-containing raw material may be mixed so as to be contained in an amount of 0.1% to 5% by weight based on the total weight of the lithium-rich manganese-based oxide and the tungsten (W)-containing raw material. In particular, it can be mixed to be contained in an amount of 2% to 5% by weight.

There is a difference in the specific materials formed by the mixing amount of the tungsten-containing raw material and the lithium-rich manganese-based oxide, the particle size thereof, the temperature of the heat treatment, etc. However, the addition of the tungsten-containing raw material within the above range is most preferable.

When the tungsten-containing raw material is added in very large amount beyond the above range, the constitutions existing in the form of a tungsten compound increases and resistance may increase due to coating. And when the tungsten-containing raw material is added in very small amounts, the effect of the surface protection property is deteriorated, which is not preferable.

The mixing of the above-mentioned step (i) is not limited to a known method as a conventionally known technique, but in particular, it may be a dry mixing method.

The mixing of the above step (i) is a conventionally known technique, and is not limited to a known method, but specifically, it may be a dry mixing method.

Here, the particle diameter ($D_{50}$) which is the average diameter of the tungsten-containing raw material may be 0.05 μm to 1 μm.

Therefore, by the above mixing, the tungsten-containing raw material can be attached in the form of particles to the surface of the lithium-rich lithium manganese-based oxide.

The mixture thus formed may be heat-treated to form a lithium tungsten compound as a reaction of the tungsten raw material. At this time, the heat treatment may be performed at 300 to 800 degrees Celsius and may be performed for 5 to 12 hours.

When the heat treatment temperature is too low beyond the above range, resistance increases due to the tungsten compound left unreacted, which causes a problem of reduction of capacity and deterioration of rate characteristic. When the heat treatment temperature is too high, the lithium-rich lithium manganese-based oxide and the tungsten raw material constituting the positive electrode active material particles are completely reacted and used, making it possible to change the physical and chemical properties of the positive electrode active material, which is not preferable.

Another embodiment of the invention provides a positive electrode in which a positive electrode mixture containing the positive electrode active material is formed on a current collector.

The positive electrode mixture may further include a conductive material and a binder in addition to the positive electrode active material.

Specifically, the positive electrode can be produced, for example, by coating a positive electrode slurry in which a positive electrode active material, a conductive material and a binder are mixed in a positive electrode current collector, and then drying and pressing the slurry.

The positive electrode current collector is generally manufactured to have a thickness of 3 to 201 μm. Such positive electrode current collector is not particularly limited as long as it has high conductivity without inducing any chemical change in the battery. For example, any one selected from the group consisting of stainless steel, aluminum, nickel, titanium, a surface treated material of aluminum or stainless steel with carbon, nickel, titanium or silver may be used, and specifically, aluminum may be used. The current collector may form fine irregularities on its surface to increase the adhesion strength of the positive electrode active material, and it may be used in various shapes such as a film, a sheet, a foil, a net, a porous body, a foam, a non-woven fabric, and the like.

The positive electrode active material may, for example, in addition to the above-mentioned positive electrode active material particles, further include layered compounds such as lithium nickel oxide ($LiNiO_2$) or compounds substituted with one or more transition metals; lithium manganese oxides such as the formulas $Li_{1+x}Mn_{2-x}O_4$ (wherein, x is 0 to 0.33), $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides represented by the formula $LiNi_{1-x}M_xO_2$ (wherein, M=Co, Mn, Al, Cu, Fe, Mg, B or Ga, x=0.01 to 0.3); lithium manganese composite oxides represented by the formula $LiMn_{2-x}M_xO_2$ (wherein, M=Co, Ni, Fe, Cr, Zn or Ta, x=0.01 to 0.1) or $Li_2Mn_3MO_8$ (wherein, M=Fe, Co, Ni, Cu or Zn); $LiMn_2O_4$ where some of Li atoms in the formula are substituted with alkaline earth metal ions; disulfide compounds; $Fe_2(MoO_4)_3$; and the like, but are not limited thereto. Of course, positive electrode active material may be composed of only the positive electrode active material according to the present invention, and the positive electrode active material according to the present invention may include at least 80% by weight or more.

The conductive material is generally added in an amount of 0.1 to 30% by weight based on the total weight of the mixture containing the positive electrode active material. The conductive material is not particularly limited as long as it has conductivity without inducing any chemical change in the battery. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive material.

The binder is a component that assists in bonding between the active material and the conductive agent or the like and bonding to the current collector, and is usually added in an amount of 0.1 to 30% by weight based on the total weight of the mixture containing the positive electrode active material. Examples of these binders include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The positive electrode may be used for a positive electrode for lithium secondary batteries, and the lithium secondary battery comprises the positive electrode, a negative electrode, a separator, and a non-aqueous electrolyte containing a lithium salt.

Hereinafter, other configurations of the lithium secondary battery will be described.

The negative electrode is manufactured by coating a negative electrode active material onto a negative electrode current collector and drying it, and if necessary, the components contained in the positive electrode described above can be optionally further included.

The negative electrode current collector is generally manufactured to have a thickness of 3 to 500 μm. Such negative electrode current collector is not particularly limited as long as it has conductivity without inducing any chemical change in the battery. For example, copper, stainless steel, aluminum, nickel, titanium, calcined carbon, a surface treated material of copper or stainless steel with carbon, nickel, titanium, silver or the like, an aluminum-cadmium alloy, etc. may be used. Further, similarly to the positive electrode current collector, the negative electrode current collector may form fine irregularities on its surface to increase the adhesion strength of the negative electrode active material, and it can be used in various shapes such as such as a film, a sheet, a foil, a net, a porous body, a foamed body, a non-woven fabric, etc.

Examples of the negative electrode active material include carbon such as hardly graphitizable carbon and graphite-based carbon; metal composite oxides such as $Li_xFe_2O_3 (0 \leq x \leq 1)$, $Li_xWO_2 (0 \leq x \leq 1)$, $Sn_xMe_{1-x}Me'_yO_z$ (Me: Mn, Fe, Pb, Ge; Me': Al, B, P, Si, Group I, II and III elements, halogen; $0 < x \leq 1$; $1 \leq y \leq 3$; $1 \leq z \leq 8$); lithium metals; lithium alloys; silicon-based alloys; tin-based alloys; metal oxides such as SnO, $SnO_2$, PbO, $PbO_2$, $Pb_2O_3$, $PO_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials; and the like.

The separator is interposed between the positive electrode and the negative electrode, and an insulating thin film having high ion permeability and mechanical strength is used. A pore diameter of the separator is generally 0.01 to 10 μm, and a thickness thereof is generally 5 to 300 μm. For example, there may be used olefin-based polymers such as polypropylene, which is chemically resistant and hydrophobic; a sheet or a non-woven fabric made of glass fiber, polyethylene or the like may be used as an example of the separator. When a solid electrolyte such as a polymer is used as the electrolyte, the solid electrolyte may also serve as a separator.

The lithium salt-containing non-aqueous electrolyte consists of a non-aqueous electrolyte and lithium. As the non-aqueous electrolyte, a non-aqueous organic solvent, an organic solid electrolyte, an inorganic solid electrolyte or the like may be used, but is not limited thereto.

As examples of the non-aqueous organic solvent, there may be mentioned non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include, but are not limited to, LiCl, LiBr, LiI, $LiCl_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. If necessary, in order to impart incombustibility, the electrolyte may further include halogen-containing solvents, such as carbon tetrachloride and ethylene trifluoride. Furthermore, in order to improve high-temperature storage characteristics, the electrolyte may further include carbon dioxide gas, and may further include fluoro-ethylene carbonate (FEC), propene sultone (PRS), etc.

BRIEF DESCRIPTION OF THE DRAWINGS

FIG. 1 is an SEM photograph of a positive electrode active material according to Example 1.

FIG. 2 is an SEM photograph of the positive electrode active material according to Comparative Example 1.

FIG. 3 is a comparative graph showing the press density according to Experimental Example 1.

FIGS. 4 and 5 are graphs comparing press densities according to Reference Example 1.

DETAILED DESCRIPTION OF THE EMBODIMENTS

Hereinafter, the present invention will be described in further detail with reference to the following examples. However, the following examples are for illustrative purposes only and are not intended to limit the scope of the present invention.

Preparation Example 1

A precursor was synthesized so that the molar ratio of Ni, Co and Mn was 18:18:64, and then mixed with $Li_2CO_3$ so that the molar ratio of Li:(Ni+Mn+Co) became 1.35:1. The mixture was then calcinated in a furnace at 940° C. for 10 hours to prepare $Li_{1.18}Ni_{0.15}Co_{0.15}Mn_{0.52}O_2$.

Preparation Example 2

A precursor was synthesized so that the molar ratio of Ni, Co and Mn was 12:12:76, and then mixed with $Li_2CO_3$ so that the molar ratio of Li:(Ni+Mn+Co) became 1.4:1. The mixture was then calcinated in a furnace at 940° C. for 10 hours to prepare $Li_{1.2}Ni_{0.1}CO_{0.1}Mn_{0.6}O_2$.

Preparation Example 3

A precursor was synthesized so that the molar ratio of Ni, Co and Mn was 22:22:56, and then mixed with $Li_2CO_3$ so that the molar ratio of Li:(Ni+Mn+Co) became 1.2:1. The mixture was then calcinated in a furnace at 940° C. for 10 hours to prepare $Li_{1.1}Ni_{0.2}CO_{0.2}Mn_{0.5}O_2$.

Example 1

$Li_{1.18}Ni_{0.15}Co_{0.15}Mn_{0.52}O_2$ and $WO_3$ were mixed in a weight ratio of 98:2 by using a ball mill, and the mixture was calcinated in a furnace at 600° C. for 10 hours to produce a positive electrode active material.

The SEM photograph of the synthesized positive electrode active material is shown in FIG. 1.

Referring to FIG. 1, it can be confirmed that in the case of the positive electrode active material according to Example 1, powders such as fine powders having a size of several hundred of nanometers presented on the surface of the active material in Comparative Example 1 were clearly reduced in Example 1 as compared with the positive electrode active material according to Comparative Example 1 shown in FIG. 2, and thus the surface of the active material of Example 1 became smoother than the surface of the active material of Comparative Example 1.

As a result of analyzing the positive electrode active material as described above, it was confirmed that it contains the composition of the lithium tungsten oxide. At this time, the content thereof was confirmed to be about 2.1 to 2.5% by weight based on the total weight of the positive electrode active material.

Example 2

A positive electrode active material was produced in the same manner as in Example 1, except that $Li_{1.18}Ni_{0.15}Co_{0.15}Mn_{0.52}O_2$ prepared in Preparation Example 1 and $WO_3$ were mixed in a weight ratio of 96:4 by using a ball mill.

As a result of analyzing the positive electrode active material as described above, it was confirmed that it contains the composition of the lithium tungsten oxide. At this time, the content thereof was confirmed to be about 4.1 to 5% by weight based on the total weight of the positive electrode active material.

Example 3

A positive electrode active material was produced in the same manner as in Example 1, except that $Li_{1.2}Ni_{0.1}CO_{0.1}Mn_{0.6}O_2$ prepared in Preparation Example 2 and $WO_3$ were mixed in a weight ratio of 96:4 by using a ball mill.

As a result of analyzing the positive electrode active material as described above, it was confirmed that it contains the composition of the lithium tungsten oxide. At this time, the content thereof was confirmed to be about 2.1 to 2.5% by weight based on the total weight of the positive electrode active material.

Example 4

A positive electrode active material was produced in the same manner as in Example 1, except that $Li_{1.1}Ni_{0.2}CO_{0.2}Mn_{0.5}O_2$ prepared in Preparation Example 3 and $WO_3$ were mixed in a weight ratio of 98:2 by using a ball mill.

As a result of analyzing the positive electrode active material as described above, it was confirmed that it contains the composition of the lithium tungsten oxide. At this time, the content thereof was confirmed to be about 2.1 to 2.5% by weight based on the total weight of the positive electrode active material.

Comparative Example 1

$Li_{1.18}Ni_{0.15}Co_{0.15}Mn_{0.52}O_2$ prepared in Preparation Example 1 was prepared as a positive electrode active material.

The SEM photograph of the synthesized positive electrode active material is shown in FIG. 2.

Comparative Example 2

A positive electrode active material was produced in the same manner as in Example 1, except that $Li_{1.18}Ni_{0.15}Co_{0.15}Mn_{0.52}O_2$ prepared in Preparation Example 1 and $WO_3$ were mixed in a weight ratio of 93:7 by using a ball mill.

As a result of analyzing the positive electrode active material as described above, it was confirmed that it contains the composition of the lithium tungsten oxide. At this time, the content thereof was confirmed to be about 7.1 to 8.8% by weight based on the total weight of the positive electrode active material.

Experimental Example 1

The powder press density was measured for each of the positive electrode active materials prepared in Examples 1 to 4 and Comparative Examples 1 and 2, and the results are shown in FIG. 3 below.

Referring to FIG. 3, it can be confirmed that when the lithium tungsten compound is contained on the lithium-rich lithium manganese-based oxide according to the present invention, the press density is improved. It can also be confirmed that the press density improves as the content of these materials increases to a certain level. However, in Comparative Example 2 in which the content exceeds a certain level, the press density is lower than that of Comparative Example 1 in which the surface treatment is not performed, and it is confirmed that there is a limit to the appropriate amount of the tungsten (W) coating content. The positive electrode active material used in Examples and Comparative Examples according to the present invention exhibits low rate characteristics due to the problem in the composition of the material, and in order to overcome this problem, it has a structure of high BET unlike Reference Examples 1 and 2 below. Thus, a material with a high BET has the effect of smoothing the surface and increasing the powder press density during the surface treatment of $WO_3$ at an appropriate level. However, the amount has an optimum point, and when this amount is exceeded, the press density is rather low, but the surface characteristics (BET) at the time of application of the optimum content are the same level as those of Reference Examples 1 and 2 below. The introduction of additional tungsten (W) raw materials is expected to play a role in preventing pressing.

Reference Example 1

A positive electrode active material was produced in the same manner as in Example 1, except that $LiNi_{0.6}Co_{0.2}Mn_{0.2}O_2$ and $WO_3$ were mixed in a weight ratio of 98:2 by using a ball mill.

Reference Example 2

A positive electrode active material was produced in the same manner as in Example 1, except that $LiNi_{0.5}Co_{0.2}Mn_{0.3}O_2$ and $WO_3$ were mixed in a weight ratio of 98:2 by using a ball mill.

Reference Experimental Example

In order to confirm the change in press densities when using only $LiNi_{0.6}Co_{0.2}Mn_{0.2}O_2$ of Reference Example 1 as a positive electrode active material, and when using the positive electrode active material of Reference Example 1, and the change in press densities when using only $LiNi_{0.5}Co_{0.2}Mn_{0.3}O_2$ of Reference Example 2 as a positive electrode active material, and when using the positive electrode active material of Reference Example 2, the powder press densities were confirmed in the same manner as in Experimental Example 1 by using the positive electrode active materials, and the results are shown in FIGS. 4 and 5 below.

Referring to FIGS. 4 and 5, it can be confirmed that in the case of using the lithium transition metal oxide having the compositions of Reference Examples 1 and 2, the press densities are rather reduced by the formation of the lithium tungsten compound. This is because, originally, the lithium transition metal oxide having the above composition has a high press density, whereas when the BET is low and thus a lithium tungsten compound is additionally formed, the homogeneity of the surface is rather lowered to impede pressing.

Experimental Example 2

Each of the positive electrode active materials prepared in Examples 1 to 4 and Comparative Examples 1 and was used, and PVdF as a binder and Super-P as a conductive material were used. The positive electrode active material, the binder and the conductive material were mixed well in a weight ratio of 96:2:2 in NMP, and the mixture was coated onto an Al foil having a thickness of 20 μm, dried at 130° C. and pressed so that the porosity was 30%, thereby producing positive electrodes.

An artificial graphite was as a negative electrode active material, and an artificial graphite:a conductive material (Super-P) and a binder (PVdF) were mixed in a weight ratio of 95:2.5:2.5, and the mixture was added to NMP as a solvent to prepare a negative electrode mixture slurry. The slurry was then coated on a copper foil in a thickness of 70 μm, dried and pressed at 130 degrees Celsius to produce a negative electrode.

Secondary batteries were manufactured by using the positive electrode and the negative electrode, a polyethylene membrane (Celgard, thickness: 20 μm) as a separator, and a liquid electrolyte in which $LiPF_6$ was dissolved at 1 M in a mixed solvent of ethylene carbonate, dimethylene carbonate, and diethyl carbonate in a ratio of 1:2:1.

The above secondary batteries were tested for rate characteristics in a voltage range of 2.5 V to 4.6 V, and the results are shown in Table 1 below.

TABLE 1

| | 0.1 C/0.1 C vs. 0.1 C/0.1 C | 0.2 C/0.2 C vs. 0.1 C/0.1 C | 0.5 C/0.5 C vs. 0.1 C/0.1 C |
|---|---|---|---|
| Example 1 | 100% | 95% | 81% |
| Example 2 | 100% | 94.7% | 83.1% |
| Example 3 | 100% | 96.1% | 82% |
| Example 4 | 100% | 94% | 78.3% |
| Comparative Example 1 | 100% | 94% | 70.3% |
| Comparative Example 2 | 100% | 94% | 80.8% |

Referring to Table 1, it can be confirmed that when the lithium tungsten compound is formed with the content according to the present invention, a better rate characteristic is exhibited as compared with the case where no lithium tungsten compound is formed (Examples 1 to 4 and Comparative Example 1). However, referring to Examples 1 and 2 and Comparative Example 2, it can be confirmed that when too much content of the lithium tungsten compound is mixed, the rate characteristic of Comparative Example 2 is rather decreased compared to Examples 1 and 2. This is expected to be because the reactant increases the resistance.

While the present invention has been shown and described with reference to exemplary embodiments thereof, it will be understood by those skilled in the art that various applications and modifications can be made within the scope of the present invention based on the contents described above.

INDUSTRIAL APPLICABILITY

As described above, the positive electrode active material according to the present invention includes the lithium-rich lithium manganese-based oxide (having a composition of Mn of 0.5 or more) in which a lithium tungsten compound, or both the lithium tungsten compound and a tungsten (W) compound is contained on a lithium-rich lithium manganese-based oxide, whereby not only it has the surface stability, and further, the tungsten-containing raw material reacts with Li existing in the lithium manganese-based oxide to form a lithium tungsten compound, and therefore, the surface roughness is reduced to improve the press density, but also the diffusion characteristics of lithium ions are improved, and the charge/reversal rate characteristics of the secondary battery including the same can be improved.

The invention claimed is:

1. A positive electrode active material comprising a lithium-rich lithium manganese-based oxide, wherein the lithium-rich lithium manganese-based oxide is represented by the following chemical formula (1),

$$Li_{1+a}Ni_xCo_yMn_zM_vO_{2-b}A_b \quad (1)$$

wherein, $0<a\leq0.2$, $0<x\leq0.4$, $0<y\leq0.4$, $0.5\leq z\leq0.9$, $0\leq v\leq0.2$, $a+x+y+z+v=1$, and $0\leq b\leq0.5$;

M is one or more elements selected from the group consisting of Al, Zr, Zn, Ti, Mg, Ga, In, Ru, Nb, and Sn; and A is one or more elements selected from the group consisting of P, N, F, S and Cl;

wherein (i) lithium tungsten (W) compound, or the (i) lithium tungsten (W) compound and (ii) tungsten (W) compound are present as a coating on a surface of a lithium-rich lithium manganese-based oxide, wherein the (i) lithium tungsten (W) compound including a composite of the (ii) tungsten (W) compound and a lithium, and wherein the (i) lithium tungsten (W) compound, or the (i) lithium tungsten (W) compound and the (ii) tungsten (W) compound are contained in an amount of 0.1% to 7% by weight based on the total weight of the positive electrode active material.

2. The positive electrode active material according to claim 1, wherein the tungsten (W) compound is at least one selected from the group consisting of tungsten oxide, tungsten carbide, and tungsten nitride.

3. The positive electrode active material according to claim 1, wherein the lithium tungsten compound is $Li_2WO_4$, $Li_4WO_5$ or $Li_6W_2O_9$.

4. A positive electrode comprising a positive electrode mixture comprising the positive electrode active material according to claim 1 formed on a current collector.

5. A secondary battery comprising the positive electrode according to claim 4.

6. A method for producing the positive electrode active material of claim 1, comprising:
   (i) mixing a lithium-rich manganese-based oxide and a tungsten (W)-containing raw material to form a mixture;
   (ii) heat treating the mixture;
   wherein the tungsten (W)-containing raw material is mixed so as to contained in an amount of 0.1% to 5% by weight based on a total weight of the lithium-rich lithium manganese-based oxide and the tungsten-containing raw material.

7. The method for producing the positive electrode active material according to claim 6, wherein the tungsten (W)-containing raw material is at least one selected from the group consisting of tungsten oxide, tungsten carbide, and tungsten nitride.

8. The method for producing the positive electrode active material according to claim 6, wherein the tungsten (W)-containing raw material reacts with lithium (Li) of a lithium-rich manganese-based oxide.

9. The method for producing the positive electrode active material according to claim 6, wherein the mixing is a dry mixing.

10. The method for producing the positive electrode active material according to claim 6, wherein the heat treating is performed at 300 to 800 degrees Celsius.

11. The method of claim 6, wherein the tungsten (W)-containing raw material has an average diameter (D50) of 0.05 μm to 1 μm.

* * * * *